United States Patent
Horsten et al.

(10) Patent No.: US 7,379,243 B2
(45) Date of Patent: May 27, 2008

(54) MIRROR WITH BUILT-IN DISPLAY

(75) Inventors: Jan Baptist Adrianus Maria Horsten, Eindhoven (NL); Markus Cornelis Jakobus Lazeroms, Vroenhoven-Riemst (BE); Dirk Jan Broer, Eindhoven (NL); Johannes Johanna Van Herk, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/507,730

(22) PCT Filed: Feb. 17, 2003

(86) PCT No.: PCT/IB03/00640

§ 371 (c)(1),
(2), (4) Date: Apr. 14, 2005

(87) PCT Pub. No.: WO03/079318

PCT Pub. Date: Sep. 25, 2003

(65) Prior Publication Data

US 2005/0185278 A1 Aug. 25, 2005

(30) Foreign Application Priority Data

Mar. 18, 2002 (EP) .................. 02076069
Oct. 17, 2002 (EP) .................. 02079306

(51) Int. Cl.
*G02B 5/30* (2006.01)
(52) U.S. Cl. ...................... 359/501; 359/839
(58) Field of Classification Search ........... 359/487, 359/494, 495, 497, 501, 246, 247, 250, 256, 359/629; 349/96, 194; 362/19; 353/20
See application file for complete search history.

(56) References Cited

U.S. PATENT DOCUMENTS

| | | | | |
|---|---|---|---|---|
| 3,162,008 A | * | 12/1964 | Berger et al. | 368/80 |
| 4,630,040 A | * | 12/1986 | Haertling | 345/48 |
| 5,835,166 A | * | 11/1998 | Hall et al. | 349/15 |
| 5,899,551 A | * | 5/1999 | Neijzen et al. | 349/115 |
| 5,995,180 A | * | 11/1999 | Moriwaki et al. | 349/96 |
| 6,106,121 A | | 8/2000 | Buckley et al. | |
| 6,111,684 A | | 8/2000 | Forgette et al. | |
| 6,147,934 A | * | 11/2000 | Arikawa et al. | 368/84 |
| 6,262,842 B1 | | 7/2001 | Ouderkirk et al. | |
| 6,385,139 B1 | | 5/2002 | Arikawa et al. | |
| 7,221,363 B2 | | 5/2007 | Roberts et al. | |
| 2002/0089622 A1 | | 7/2002 | Kuroiwa et al. | |
| 2002/0113937 A1 | | 8/2002 | Ouderkirk et al. | |
| 2002/0176164 A1 | * | 11/2002 | Motomura et al. | 359/487 |

(Continued)

FOREIGN PATENT DOCUMENTS

DE          19943355 A1       3/2001

(Continued)

*Primary Examiner*—Stephone B. Allen
*Assistant Examiner*—Derek S. Chapel

(57) ABSTRACT

A mirror device (1) which can be simultaneously used for display purposes, based on e.g. an LCD display (5) with a polarizing mirror (2) placed in front of it. The polarizing mirror (2) has the characteristics that it does not disturb the transmission of the light from the display (5), but does reflect the light from outside the area of the screen.

17 Claims, 4 Drawing Sheets

U.S. PATENT DOCUMENTS

2002/0180937 A1    12/2002    Devaan et al.
2003/0095331 A1    5/2003    Engoechea et al.
2006/0028730 A1    2/2006    Varaprasad et al.

FOREIGN PATENT DOCUMENTS

| | | | |
|---|---|---|---|
| EP | 0825477 A2 | 2/1998 |
| EP | 1 256 833 | 11/2002 |
| GB | 2362494 A | 11/2001 |
| JP | 2002122860 | 4/2002 |
| WO | 03079318 A1 | 9/2003 |

\* cited by examiner

MIRROR WITH BUILT-IN DISPLAY

The invention relates to a polarizing mirror for viewing purposes having a first plane reflecting light of a first kind of polarization to a viewing side. A "mirror for viewing purposes" in this application refers to a mirror, via which a person's eye (or an artificial eye like a (infra-red) camera lens) sees a reflected part of the outside world. As examples one may think of large mirrors, like bathroom mirrors, full-length mirrors in fitting rooms or even mirrored walls. Other examples are medium sized mirrors, like outside mirrors for trucks or dressing-table mirrors.

By "having a first plane reflecting light of a first kind of polarization" it is meant that a mirror plane acts as a polarizing plane. When in use, light within a certain range of a wavelength of light incident on a polarizing plane will be divided in two components one which is reflected by the polarizing plane and one of which passes through the polarizing plane. Generally most known is the division of light in two components having linearly polarized, perpendicular directions of polarization. On the other hand the light may be divided in right-handed and left-handed circular or, elliptical polarization.

In general practice the reflectivity of such mirrors is chosen to be optimal, i.e. as high as possible. As a consequence preferably substantially all light, or as much light as possible should be reflected for optimal functioning. Nevertheless a mirror according to the invention reflects light of a first kind of polarization to a viewing side and passes light of a second kind of polarization, but moreover is provided with a display device at its non-viewing side, which display device during use provides light of the second kind of polarization.

The display device during use emits or reflects (polarized) light.

The invention is based on the insight that at the sacrifice of some reflection a multifunctional mirror is obtained, since one or more displays can be integrated in the mirror.

A first possible application of such a mirror is an interactive bathroom-mirror. This mirror displays (preferably personalised) information like news or weatherforecast while the user is standing in front of the mirror while e.g. brushing teeth or shaving. For children the same or another display in said mirror can display interactive instructions (e.g. by means of cartoon-characters) while brushing teeth in order to learn (the timing for) brushing. The mirror can further be used for displaying television or movies while bathing.

Such a mirror can also be used as a handheld interactive device, such as a purse-mirror or in the automobile industry, where the dead-angle as viewed by a CCD-camera can directly be displayed in the rear-view mirror.

By adapting the polarization (direction) of the light of the second kind of polarization to polarization (direction) of the polarized light emitted by the display a transmission factor of substantially 100% is achieved, resulting in a high contrast of displayed information with respect to reflected images.

However when part of the mirror is used as a display the mirror function remains active in the other part of the mirror plane. The resulting reflections cause a deterioration of the daylight visibility and contrast. On the other hand when used as a mirror, only one polarization component is reflected so the reflectivity is only approx. 50%.

Moreover, when the mirror size is larger than the display size and the display is off, differences may be visible between the (dark) display and the mirror background outside the display area To overcome this problem preferably a switchable optical element is present between the display device and the viewing side of the polarizing mirror.

In one embodiment e.g. when the display is a liquid crystal display device, the switchable optical element is a switchable ½ λ plate.

In a further embodiment the viewing side of the polarizing mirror is provided with a switchable polarisor.

In a preferred embodiment the mirror and the display device are rotatable with respect to each other with respect to an axis substantially perpendicular to the first plane. Since the transmission factor for polarized light emitted by the display is now adjustable, images from the display can be dimmed or completely turned off, if wanted, by simply rotating the mirror or the display.

It is noted that DE 19943355 also shows the possibility of displaying data in a mirror, but here a semi-transparent mirror is used, based on a semi-transparent layer which is mainly reflecting to the viewer. This implies that less than 50% of the light generated in the display device is transmitted through the mirror, in practice less than 35% due to light absorption in the semi-transparent mirror, leading to a low contrast and brightness of displayed information with respect to reflected images.

Also in this device dimming by simply rotating the mirror is not possible since the semi-transparent layer does not absorb the polarized light emitted by the display device in dependence of the rotation.

These and other aspects of the invention are apparent from and will be elucidated with reference to the embodiments described hereinafter.

In the drawings:

FIG. 1 is a possible embodiment of a mirror device according to the invention, while

FIGS. 4a, 4b, 5a, and 5b are a diagrammatic cross-section of a part of another mirror device according to the invention.

Figure 6:
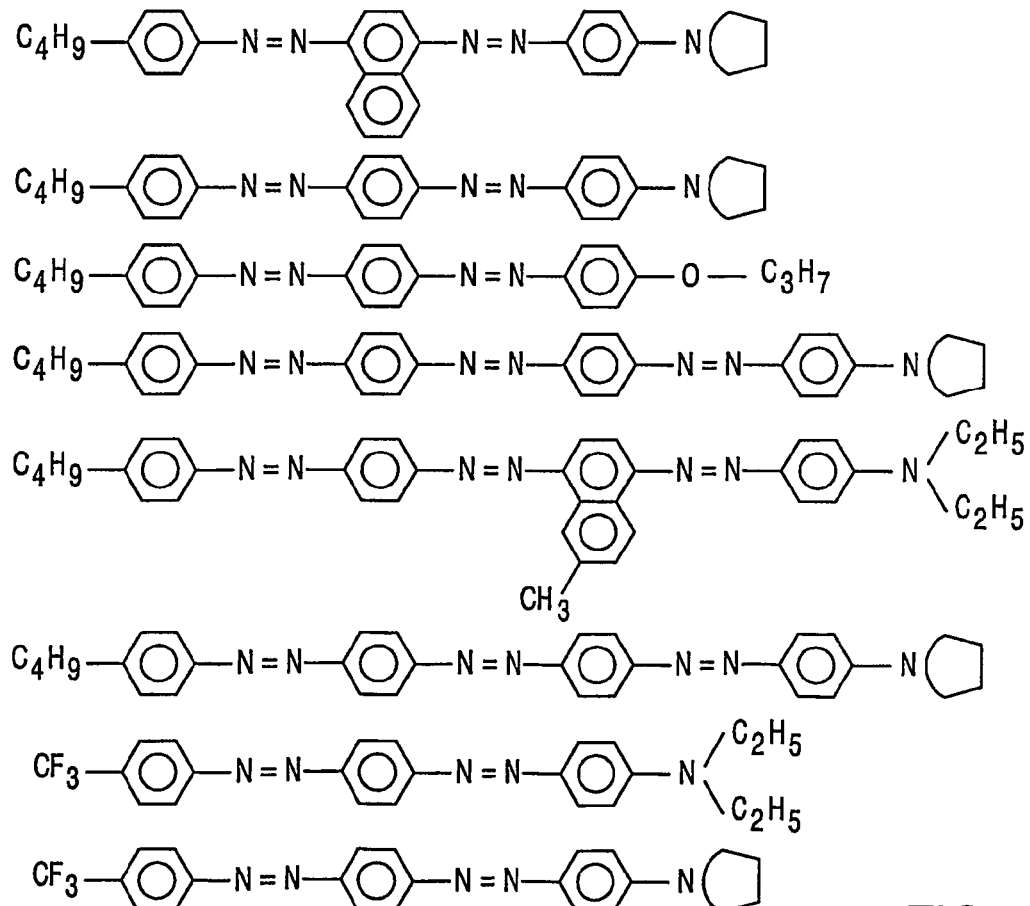
Figures 7A, 7B:
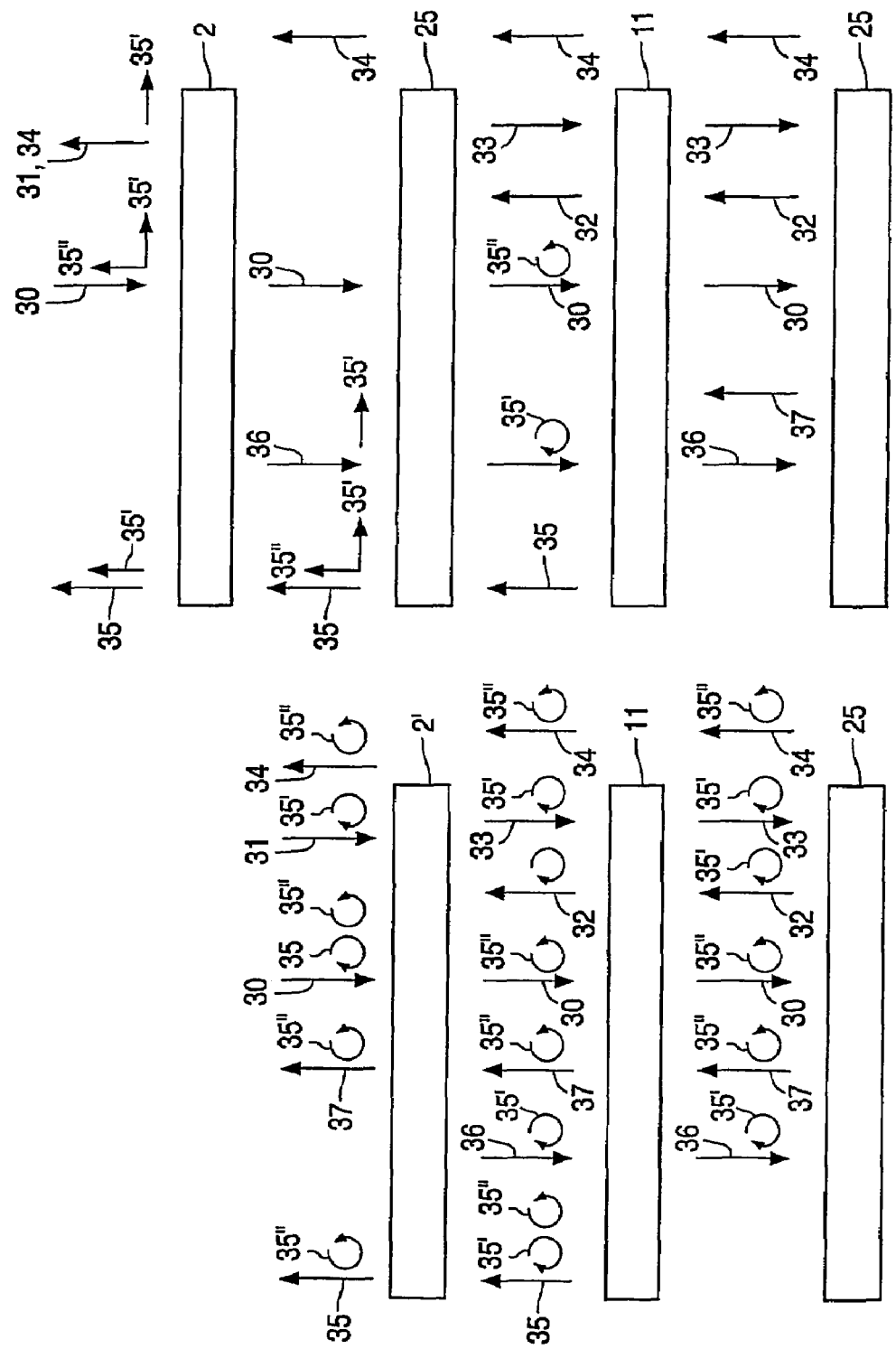

FIG. 6 shows suitable dyes that can be added to liquid crystal mixtures to obtain a switchable polarisor and FIGS. 7a and 7b are diagrammatic cross-sections of a part of another mirror device according to the invention.

The FIGS. are diagrammatic and not drawn to scale. Corresponding elements are generally denoted by the same reference numerals.

Figure 1:
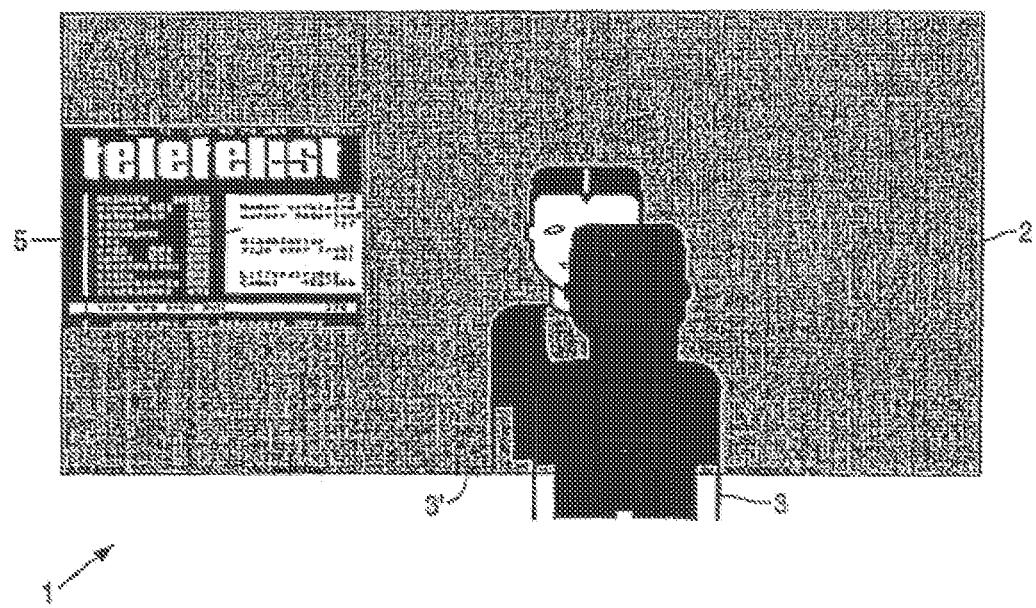
Figure 2:
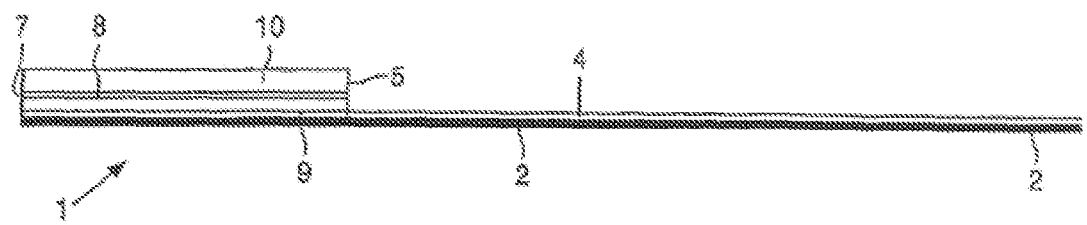
FIG. 2 is a diagrammatic cross-section of a part of a mirror device according to the invention.

FIG. 1 shows a mirror device 1 for viewing purposes having on a glass plate 4 a mirror 2 reflecting light, so a person 3 sees his image 3' (and further background, not shown). According to the invention the mirror (plane) only reflects light of a first kind of polarization (direction), but passes light of a second kind of polarization (direction). Furthermore the mirror is provided with a display device 5 at its non-viewing side (see also FIG. 2).

The display device 5 in this example is a liquid crystal display device having between two substrates (glass or plastic or any other suitable material) a liquid crystal material 7. Since most liquid crystal display devices are based on polarization effects the display 5 during use substantially emits polarized light. In general light from a backlight 10 is modulated by the liquid crystal display effect. Since the liquid crystal display device is based on a polarization effect the display 5 comprises a first polarizer 8 and a second polarizer (or analyzer) 9, which passes light of a certain polarization (direction).

This light of a certain polarization has the same (linear) polarization direction as the second kind of polarization (direction), so it passes the mirror (plane) 2 without any loss of light (100% transmission).

Since most liquid crystal display devices are based on modulation of linearly polarized light, linear polarizers 8, 9 are used, and the mirror 2 also is a linear polarization selective mirror e.g. a stack of dielectric layers, each layer having an optical thickness of one-quarter of a selected wavelength (or a mean value for a spectrum), while the layers have selected refractive indices. Another possibility is the use of so-called wire grid polarizer (a grid of thin conducting wires) that is transmissive for one polarization and reflective for the orthogonal polarization.

If the mirror and the display device are rotatable with respect to each other with respect to an axis substantially perpendicular to the first plane the transmission factor for the polarized light emitted by the display is variable, since it depends on the angle between the polarization (direction) of the modulated light and the polarization axis of the light which passes the mirror 2. In this way images from the display can be dimmed or completely turned off, if wanted, by simply rotating the mirror.

On the other hand in certain applications it may even be attractive to polarize light from e.g. an (O)LED or other display to obtain the effect of a high contrast of displayed information with respect to reflected images in mirror applications.

Figure 3:
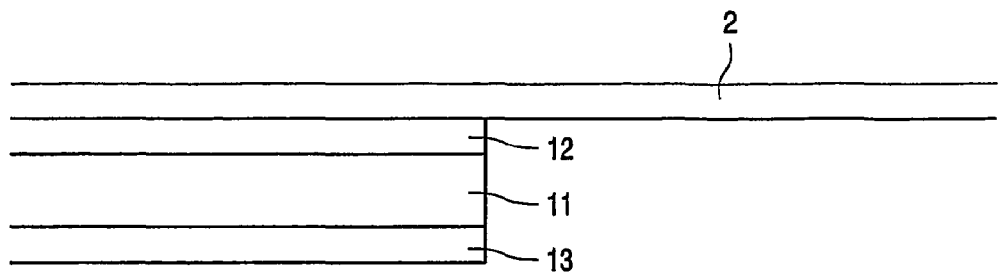
FIG. 3 is a diagrammatic cross-section of a part of another mirror device according to the invention.
Figures 4A, 4B:
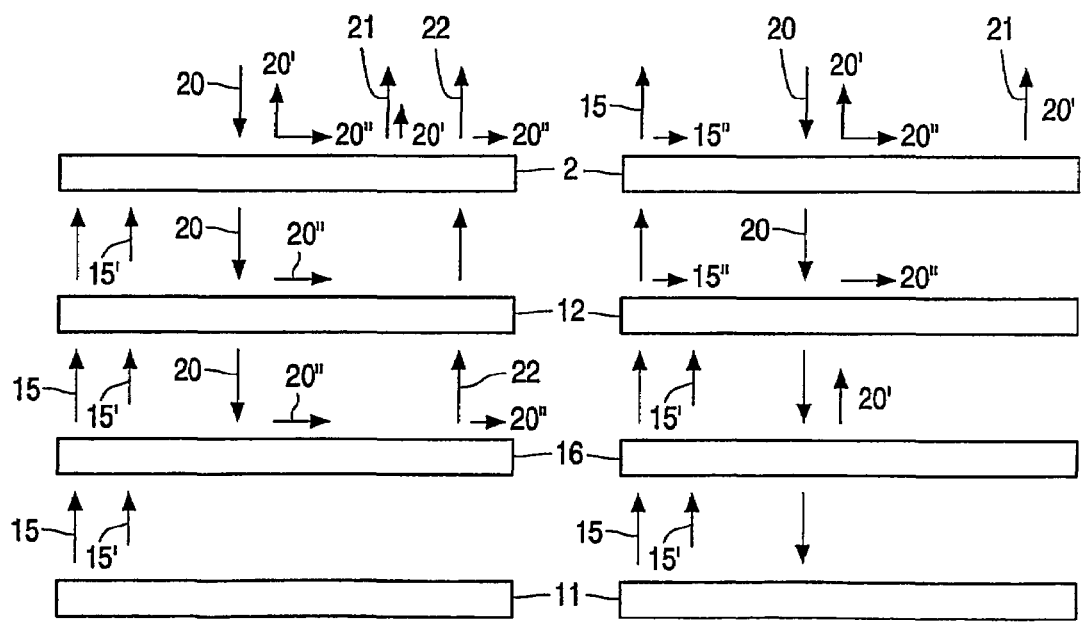

FIG. 3 shows a part of a mirror according to the invention in which a liquid crystal display 11 is used, while the optical element 12 is a ½ λ plate. If necessary the device is provided with a reflector 13.

FIG. 4 shows the working principle of this mirror. The display 11 emits linear polarized light 15 of a first polarization direction 15', either directly or by having the light passing a polarizer or a linear polarizing mirror 16. Between the linear polarizing mirror 16 and the linear polarization selective mirror 2 a switchable half-lambda plate 12 is provided. The polarization directions of the mirrors 2,16 make an angle of 90 degrees.

Incident light 20 reflects partly (one polarization direction, in this Example indicated as 20') on the mirror 2 (arrow 21). If the switchable half-lambda plate 12 is "off" FIG. 4a) or "inactive" the remaining part (other polarization direction, in this Example indicated as 20") passes said switchable half-lambda plate 12 and is reflected on the linear polarizing mirror 16. After reflection the reflected light having polarization direction 20" passes the switchable half-lambda plate 12 and the linear polarization selective mirror 2 again (arrow 22). As a result, substantially all incident light is then reflected.

In this situation the polarized light of polarization direction 15' from the display passes the linear polarizing mirror 16 and the linear polarization selective mirror 2 and the switchable half-lambda plate 12, but is blocked by the linear polarization selective mirror 2.

If the half-lambda plate 12 is "on" (FIG. 4b) or "active" it rotates the polarization direction (15") of the display light between both mirrors 2,16 to the other polarization direction (15'), making the stack transparent for the emitted display light. In that case the polarization direction 20' of the incident light 20 will pass the switchable half-lambda plate 12 and not be reflected by the liquid crystal display 11. Only the one polarization direction indicated as 20'will be reflected by the linear polarizing mirror 16 and then pass the switchable half-lambda plate 12 and the linear polarization selective mirror 2 (arrow 21). So the device can be switched between a display state (half lambda plate "on", transparent for emitted light) and a mirror state (half lambda plate "off") reflecting all incident light.

A switchable half lambda plate can e.g. be realized with known LCD techniques by using a standard planar LCD cell with anti-parallelly rubbed orientation layer and filled with a liquid crystal such that the optical retardation d.Δn is equal to a range of about 200 to 450 nm. Alternatively, a vertically aligned LC cell can be used with some pre-orientation with respect to the switching direction. In that case higher birefringent LC mixtures can be used while a modulation voltage adjusts the retardation.

In another embodiment the switchable LCD cell substrates are provided with electrodes and orientation layers, in which the direction of orientation make an angle of 90° with each other. This so-called twisted nematic (TN) mode is especially beneficial when the the product of thickness and birefringence of the liquid crystal is in the so-called first minimum of the Gooch and Tarry curve making the half-wave function insensitive for the wavelength of the visible light.

Also additional films may be utilized in order to improve the effect on viewing angle. Often when a switchable retarder is brought in between the front reflective polarizer and the second reflective polarizer the initially neutrally colored image will add some color at wider viewing angles. This effect is well understood in terms of angular dependent birefringence of the liquid crystal material and can be compensated for by additional retardation layer such as a negative C-plate or tilted retardation layers.

In this respect also an Plane Switching (IPS) mode may be used, in which in the "off" state LC molecules are parallel to a polarizer (no retardation) while in the "on" state the LC molecules are aligned at 45 degrees to the polarizers (half lambda plate)

FIG. 5 shows a further embodiment, which is very suitable to reduce reflections. The switchable optical element now is a switchable polarizing filter 14 provided at the viewing side of the polarizing mirror. The display 11 emits linear polarized light 15 of a first polarization direction 15'. The polarization direction of the filter 14 and that of the polarizing mirror 2 is the same (15'). So, independently of the state of the polarizing filter 14, the emitted light from the display stack is transmitted and not affected.

Incident light 20 partly (one polarization direction, in this Example indicated as 20") passes the switchable polarizing filter 14. If the switchable polarizing filter 14 is "off" (FIG. 5a) this part of the light, indicated as 20" is reflected on the linear polarization selective mirror 2. After reflection (arrow 21) the reflected light having polarization direction 20" passes the switchable polarizing filter 14 again (arrow 22). The other part of the light (having polarization direction 20') is transmitted through the mirror 2 and ultimately absorbed in the bulk of the display. As a result, about half of the incident light is then reflected.

Figures 5A, 5B:
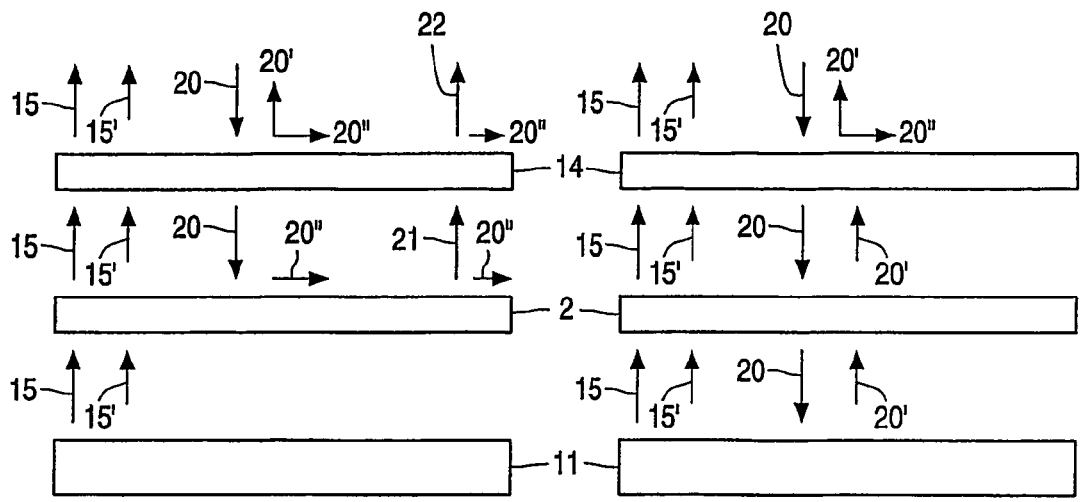

If the polarizing filter 14 is "on" (FIG. 5b), it now absorbs the light having polarization direction 20" that in FIG. 5a was passed and reflected at the mirror 2. The other component (20') passes the mirror 2 and is absorbed in the display again. As a result, no incident light is reflected. Consequently the stack can be switched between a display state (filter "on") suppressing reflections and a mirror state (filter "off") (partly) reflecting incident light.

If the display is off, it is not totally black: it reflects still a minor part of the incident light, transmitted through the mirror. In case the mirror area is larger than the display area also the background in the "non-display area" remains partly visible. Difference in color/absorption between display area and non-display area is visible if the display is off. Therefore the non-display background preferably has the same color/absorption as the display itself, e.g. by using a paint or an adhesive foil.

For the switchable polarizer several possibilities exit. In one embodiment it is built-up from passive linear polarizer(s) and a switchable half lambda retarder. Such a stack will always be a polarizer, but with a switchable orientation axis Another switchable polarizer is provided by the so-called Guest-Host system: dichroic dye molecules are dissolved in a nematic or chiral nematic liquid crystal (LC) layer. The dye molecules (Guest) are oriented by the presence of the LC molecules (Host). Applying an electric field to the layer will re-orient the LC molecules and the dye molecules will follow this re-orientation. Such a stack will either absorb light of one polarization or be transparent Some suitable dyes that can be added to liquid crystal mixtures are shown in FIG. 6.

In the embodiment of FIGS. 4 and 5 when the switchable optical element polarizing filter 14, half-lambda plate 12 is "off" no power is required, resulting in full reflection of the incident light (in this state the display itself may be off, since no light is transmitted, saving energy). In the "display state" the switchable optical element polarizing filter 14, half-lambda plate 12) is "on", allowing all light from the display to pass while suppressing all incident light.

In FIG. 7 a non-polarizing display 11 (e.g. poly LED or (O)LED) is equipped with either a cholesteric mirror 2' (FIG. 7a) or a stack of a quarter lambda plate 25 and a linear polarizing mirror 2 (FIG. 7b). The light 35 emitted by the LED display 11 is non-polarized and as such thought to be composed of two circular polarized components: left-handed (35") and right-handed (35'). One of the components (in this example the left-handed component 35") is transmitted through the mirror 2'. The other component (35') is reflected (indicated by arrow 36) and (partly) transmitted through the display and then reflected on a reflector or mirror 25 at the back of the display device (the reflector 25 may be present already. e.g. as part of a poly LED display). During this reflection the polarizing direction is reversed, the left-handed component (35") of the light (indicated by arrow 37), is transmitted again through the display and is now transmitted as well through the mirror.

Incident light 30 reflects partly (one polarization component, in this Example the right-handed indicated as 35') on the mirror 2 (arrow 31). The remaining part (left-handed polarization component 35") passes the cholesteric polarizing mirror 2 and passes the display 11. During reflection, since the polarizing direction is reversed, the left handed component (35") of the light is reversed into the right-handed component (35') of the light (indicated by arrow 32). This is transmitted again through the display but is now reflected by the mirror 2' (arrow 33). After a second reflection at the reflector 25 the polarizing direction is reversed again, the resulting left-handed component (35") of the light (indicated by arrow 34) is transmitted through the display and is now transmitted as well through the mirror 2'.

When using a cholesteric mirror the resulting light is circular polarized. The combination of quarter lambda plate and a linear polarizing mirror gives linear polarized light. the latter combination is preferable because linear polarizing mirrors give a better mirror performance.

Such a device is shown in FIG. 7b. When initially not provided with a linear or circular polarizer, the light 35 emitted by the LED display 11 is non-polarized and passes the quarter lambda plate 25 so the light 35 emitted at the viewing side of the mirror comprises linear polarized light components 35', 35". Apart from switching from circular polarized light components into linear polarized light components this device behaves in a way analogous to that of FIG. 7a.

The protective scope of the invention is not limited to the embodiments described. For instance, since the mirror 2 has a polarizing effect the second polarizer (or analyzer) 9 in FIG. 2 may be deleted, if wanted.

Although a backlit transmissive liquid crystal display device has been described, the use of reflective liquid crystal display devices is not excluded.

On the other hand as shown light from e.g. an (O)LED may be polarized or it may even be attractive to use other display effects to obtain the effect of a high contrast of displayed information with respect to reflected images in mirror applications.

Also, as mentioned in the introduction, more than one display can be integrated in the mirror, whereas many other applications areas can be thought of (rear view mirrors, fitting rooms, etcetera). In some applications, if a matrix form is used, with adequate driving circuitry the switching between mirror-state and display state can be done locally.

Apart from this certain elements may be combined into one e.g. combinations of the mirror 2 and the switchable half-lambda plate 12 or the switchable polarizer 14 may be thought of The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A device for viewing reflected images and displayed images, comprising:
   a polarizing mirror that reflects light of a first kind of polarization and passes light of a second kind of polarization, and is configured to provide the reflected images on a viewing side of the polarizing mirror in a first area of a surface of the device, and
   a display device that is configured to provide light of the second kind of polarization from a non-viewing side to the viewing side of the polarizing mirror to selectively provide the displayed images in a second area, the second area being within the first area and significantly smaller than the first area.

2. The device of claim 1, including a switchable optical element between the display device and the viewing side of the polarizing mirror.

3. The device of claim 2, wherein the switchable optical element includes a switchable ½ λ plate between the display device and the polarizing mirror.

4. The device of claim 3, including a further polarizing mirror between the display device and the switchable optical element.

5. The device of claim 2, wherein the viewing side of the polarizing mirror is provided with a switchable polarizer.

6. The device of claim 2, wherein the display device is provided with a reflecting layer at a side remote from the polarizing mirror.

7. The device of claim 2, wherein the polarizing mirror includes a linear polarization selective mirror.

8. The device of claim 1, wherein the display device emits or reflects light of the second kind of polarization.

9. The device of claim 1, wherein the first kind of polarization and the second kind of polarization have substantially perpendicular linear polarization directions.

10. The device of claim 1, wherein the first kind of polarization and the second kind of polarization are circular or elliptical polarizations of an opposite kind.

11. The device of claim 1, wherein the polarizing mirror includes a cholesteric mirror.

12. The device of claim 1, wherein the display device includes a reflecting layer at a side remote from the polarizing mirror.

13. The device of claim 1 in which the polarizing mirror and the display device are rotatable with respect to each other with respect to an axis substantially perpendicular to the first plane.

14. The device of claim 1 in which the polarizing mirror and the display device have a polarizer in common.

15. The device of claim 1 in which the display device belongs to the group of liquid crystal display devices and light emitting devices.

16. A device comprising:
a first polarizing mirror that reflects light of a first polarization toward a viewing side of the device and passes light of a second polarization,
a second polarizing mirror that reflects light of the second polarization toward the viewing side and passes light of the first polarization,
a switchable optical element situated between the first and second polarizing mirrors that is configured to selectively:
pass light of the second polarization in a first state, so that light of a second polarization from the first polarizing mirror is reflected from the second polarizing mirror, and
transform light of the first polarization from the second polarization mirror to light of the second polarization in a second state, so that light of the first polarization from a non-viewing side of the device is passed through the device to the viewing side, and
a display element that is situated on the non-viewing side of the device, and is configured to provide an image to be displayed via the light of the first polarization from the non-viewing side of the device.

17. The device of claim 16, wherein the light of the first polarization from the display element includes light of the first polarization from the second polarizing mirror that is reflected from the display element.

* * * * *